United States Patent
Herington

(10) Patent No.: US 7,730,486 B2
(45) Date of Patent: Jun. 1, 2010

(54) SYSTEM AND METHOD FOR MIGRATING VIRTUAL MACHINES ON CLUSTER SYSTEMS

(75) Inventor: Daniel E. Herington, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1495 days.

(21) Appl. No.: 11/067,838

(22) Filed: Feb. 28, 2005

(65) Prior Publication Data

US 2006/0195715 A1 Aug. 31, 2006

(51) Int. Cl.
G06F 9/455 (2006.01)
G06F 9/46 (2006.01)
G06F 15/173 (2006.01)

(52) U.S. Cl. .................. 718/1; 718/104; 709/223; 709/224; 709/226

(58) Field of Classification Search .................. 718/1, 718/104; 709/220, 223–226
See application file for complete search history.

(56) References Cited

U.S. PATENT DOCUMENTS

| | | | | |
|---|---|---|---|---|
| 4,916,608 A | * | 4/1990 | Shultz | 718/104 |
| 7,203,944 B1 | * | 4/2007 | van Rietschote et al. | 718/104 |
| 7,328,259 B2 | * | 2/2008 | Srinivasan et al. | 709/223 |
| 7,383,405 B2 | * | 6/2008 | Vega et al. | 711/162 |
| 2004/0215749 A1 | * | 10/2004 | Tsao | 709/220 |
| 2006/0005189 A1 | * | 1/2006 | Vega et al. | 718/1 |
| 2007/0130566 A1 | * | 6/2007 | van Rietschote et al. | 718/1 |

FOREIGN PATENT DOCUMENTS

| | | |
|---|---|---|
| JP | H02-210542 | 8/1990 |
| JP | H07-160657 | 6/1995 |
| JP | 10-283210 | 10/1998 |
| JP | 2970082 | 8/1999 |
| JP | 2002-202959 | 7/2002 |

* cited by examiner

*Primary Examiner*—Meng-Ai An
*Assistant Examiner*—Jennifer N To

(57) ABSTRACT

In one embodiment, a method comprises executing a plurality of virtual machines on a plurality of nodes of a cluster computing system, wherein at least one application is executed within each of the plurality of virtual machines, generating data that is related to performance of applications in the virtual machines, analyzing, by a management process, the data in view of parameters that encode desired performance levels of applications, and migrating, by the management process, a virtual machine on a first node to a second node of the plurality of nodes in response to the analyzing.

17 Claims, 3 Drawing Sheets

SYSTEM AND METHOD FOR MIGRATING VIRTUAL MACHINES ON CLUSTER SYSTEMS

FIELD OF THE INVENTION

The present application is generally related to cluster systems and virtual machines.

DESCRIPTION OF RELATED ART

A number of software products are available that "virtualize" computing resources. An example of a virtualization product for the Intel 32-bit computing architecture is the VMware ESX server product. Some virtualization software products operate by executing an operating system (the "host" operating system) on a server platform. The kernel of the host operating system typically includes a virtualization software layer. The virtualization software layer creates software constructs corresponding to hardware components. For example, virtual processors, virtual network interface cards, and virtual storage resources may be instantiated by the virtualization software layer. The number of virtual resources may exceed the physical resources available on the server platform. For example, the number of virtual processors may exceed the number of physical processors by scheduling access to the physical processors (i.e. time sharing).

The virtual resources are assigned to virtual machines. The virtual machines are used to execute "guest" operating systems as respective processes on top of the host operating system. The guest operating systems, in turn, may be used to execute one or several applications. The virtualization software layer of the host operating system may schedule execution of processes in accordance with the assignment of virtual processors to the virtual machines.

The creation and operation of virtual machines in this manner provides a number of advantages. Specifically, conventional information technology (IT) implementations involve executing each application on a discrete server platform. When such an approach is selected, the utilization of the server platforms can be relatively low and, hence, resources are essentially wasted. By executing applications in respective virtual machines instead of physical servers, the utilization rate can be much higher. Moreover, administrative costs associated with maintaining multiple server platforms can be avoided.

Known virtualization software products provide other useful functionality. For example, if two server platforms are coupled to the same storage area network (SAN), some virtualization products enable administrative personnel to transfer an application executing in a virtual machine on one platform to a virtual machine on the other platform. For example, routine maintenance may be performed for a platform and virtual machines executing on that platform can be moved to one or several other platforms. Such a migration can occur if the virtual machines to be migrated store their data using the SAN.

SUMMARY

In one embodiment, a method comprises executing a plurality of virtual machines on a plurality of nodes of a cluster computing system, wherein at least one application is executed within each of the plurality of virtual machines, generating data that is related to performance of applications in the virtual machines, analyzing, by a management process, the data in view of parameters that encode desired performance levels of applications, and migrating, by the management process, a virtual machine on a first node to a second node of the plurality of nodes in response to the analyzing.

In another embodiment, a cluster system comprises a plurality of cluster nodes that provide hardware elements to support software operations, a plurality of virtual machines executing on the plurality of cluster nodes, wherein at least one application is executed within each of the plurality of virtual machines, and a management process located on at least one of the plurality of cluster nodes, wherein the management process analyzes performance data associated with applications executing within the plurality of virtual machines and migrates virtual machines between the plurality of cluster nodes in response to analysis of the performance data.

In another embodiment, a computer readable medium for management of applications executed within virtual machines of a cluster system comprises code for generating performance data related to execution of applications within the virtual machines of the cluster system, code for processing the performance data to determine whether applications are satisfying desired operating goals encoded within a set of parameters, and code for migrating virtual machines between cluster nodes of the cluster system in response to the code for processing.

DETAILED DESCRIPTION

Some representative embodiments are directed to a Single System Image (SSI) cluster architecture adapted to execute virtual machines. An SSI cluster refers to a collection of systems with hardware and software connectivity that present an "image" of a single node to system administrators and applications. By providing such an image, virtual machines may be flexibly transitioned between cluster members to optimize resource utilization of the cluster resources. Additionally, by employing a single image, the configuration of a virtual machine for a particular workload or application need only occur once for any of the nodes of the cluster. In some embodiments, workload management algorithms are employed to allocate cluster resources. Specifically, application performance data may be analyzed in view of "service level objective" parameters. The analysis may be used to reallocate resources between virtual machines. Additionally, the analysis may be used to transition a virtual machine from one cluster platform to another. By managing virtual machines in a cluster system in this manner, more efficient resource utilization may be achieved.

Figure 1:
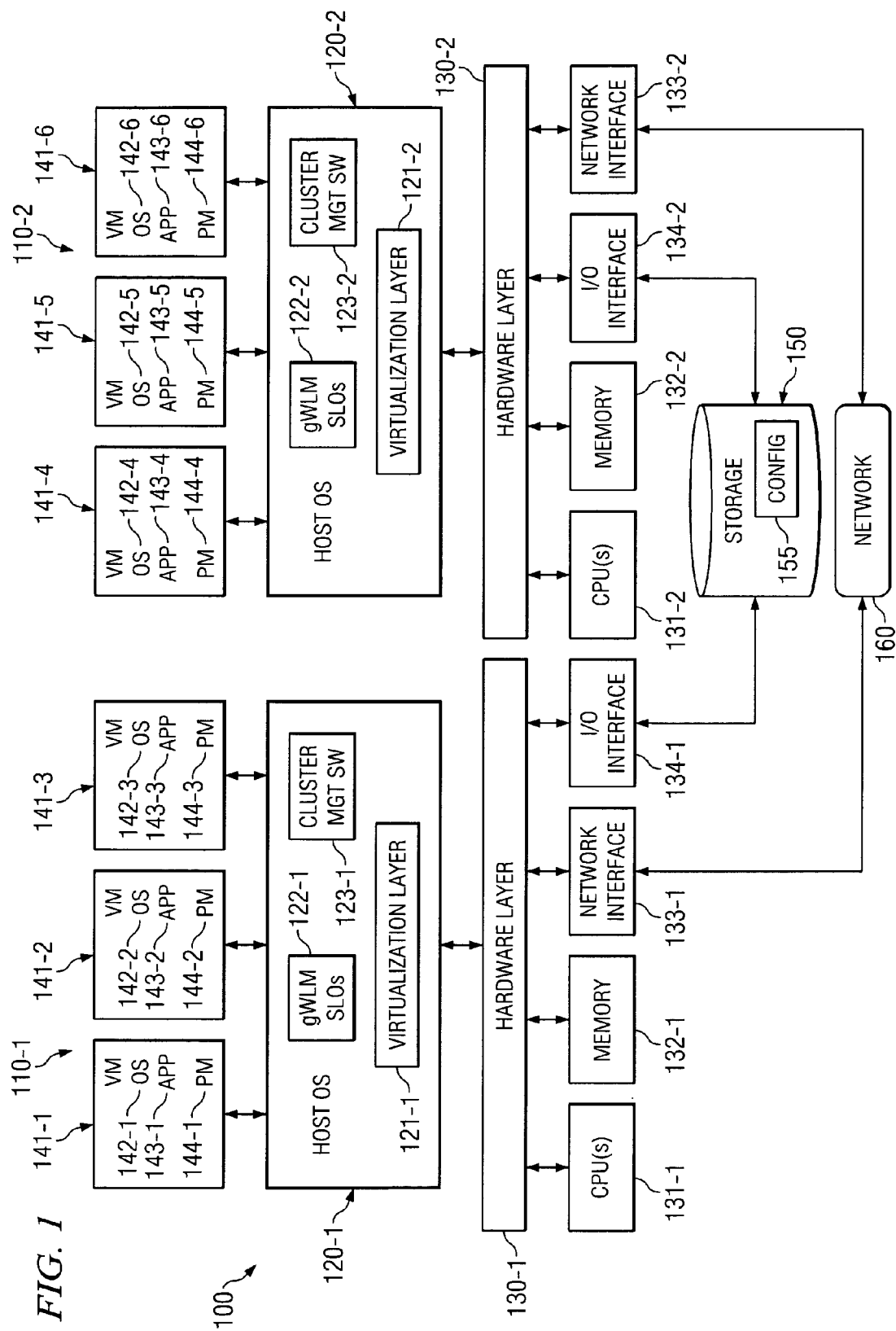
FIG. 1 depicts a cluster system according to one representative embodiment.

Referring now to the drawings, FIG. 1 depicts system 100 according to one representative embodiment. System 100 includes server platforms 110-1 and 110-2. Although only two server platforms are shown in FIG. 1, any number of server platforms 110 may be employed within a cluster architecture according to other embodiments. Each server platform 110 includes host operating system 120 that controls low-level access to hardware layer 130 of the platform. In one embodiment, host operating system 120 includes virtualization layer 121 within its kernel as an example. Virtualization layer 121 creates software constructs (logical devices) that correspond to the physical resources of hardware layer 130 of platform 110. Hardware layer 130 may include any number of physical resources such as CPU(s) 131, memory 132, network interface 133 to access network 160, input/output (I/O) interface 134 to access storage 150, and/or the like.

In one embodiment, virtual resources (e.g., one or several virtual CPUs, virtual memory, virtual network interface card, virtual I/O interface, and/or the like) are assigned to each virtual machine 141 using configuration files 155. The number of virtual CPUs may exceed the number of physical CPUs 131. Host operating system 121 may schedule the execution of the processes associated with virtual machines 141 on physical CPUs 131 in accordance with the assigned virtual CPUs.

Each virtual machine 141 is executed as a process on top of guest operating system 120 in accordance with its assigned virtual resources. CPU virtualization may occur in such a manner to cause each virtual machine 141 to appear to run on its own CPU or set of CPUs. The CPU virtualization may be implemented by providing a set of registers, translation lookaside buffers, and other control structures for each virtual CPU. Accordingly, each virtual machine 141 is isolated from other virtual machines 141. Additionally, each virtual machine 141 is used to execute a respective guest operating system 142. The virtual resources assigned to the virtual machine 141 appear to the guest operating system 142 as the hardware resources of a physical server. Guest operating system 142 may, in turn, be used to execute one or several applications 143. Each guest operating system 142 may be individually tuned and/or patched according to the characteristics of its associated applications 143.

Typical disk virtualization is implemented by creating a respective file on a network storage device for each virtual disk. The guest operating systems 142 access the virtual disks through conventional operations and the host operating system 120 translates the disk operations to access the corresponding files. In some embodiments, disk virtualization is performed using a cluster file system as will be discussed below.

Network virtualization may be implemented by creating virtual network cards having respective medium access control (MAC) addresses and Internet Protocol (IP) addresses. The virtual network cards may be mapped to a dedicated network interface 133 or virtual network interfaces from multiple virtual machines 141 may share a single network interface 133.

Host operating system 120 comprises cluster management software 123 to support cluster functionality. The cluster functionality enables multiple independent physical systems to be operated and managed as a single system. Cluster management software 123 may form a cluster, add members to a cluster, and remove members from a cluster. Cluster management software 123 may also present a comprehensive view of the resources of the entire cluster.

In some representative embodiments, cluster management software 123 implements Single System Image (SSI) functionality. An SSI cluster refers to a collection of server platforms 110 with hardware and software connectivity that present an "image" of a single node to system administrators and applications. For example, storage 150 may include direct attached devices and network attached devices. Cluster management software 123 may control access to the discrete devices of storage 150 to cause storage 150 to appear as a single file system having a single root. The shared single root enables a single copy of suitable configuration files to be used for each server platform 110. Accordingly, administrative activities may be simplified.

Figure 2:
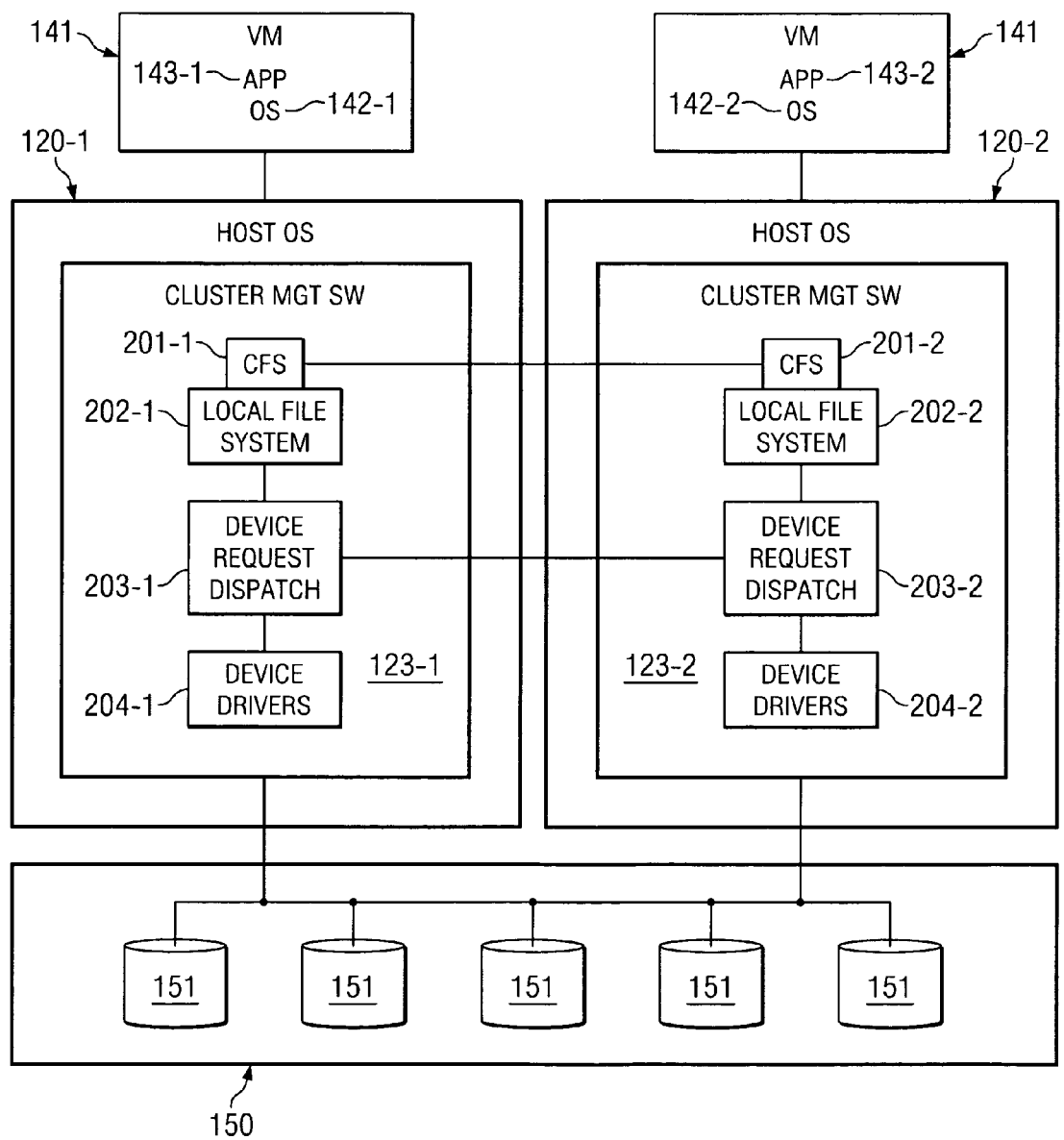
FIG. 2 depicts various software layers associated with a cluster file system according to one representative embodiment.

Referring to FIG. 2, a single system image functionality may be implemented using a number of software layers. As shown in FIG. 2, an application 143 in a virtual machine 141 may perform file operations using conventional functionality via its guest operating system 142. Guest operating system 142 performs file operations by accessing the virtual I/O interfaces and storage devices assigned to its virtual machine 141. The virtual storage resources are created from the unified cluster file system presented by cluster file system (CFS) software layer 201. Accordingly, a file located on any particular storage device 151 of storage 150 may be accessed from any server platform 110 using the same filename.

Specifically, CFS 201 may present a unified cluster file system by creation of a single, clusterwide namespace for files and directories. CFS 201 is layered upon traditional file system software modules (shown as local file system 202) such as "AdvFS" modules. When implemented as a distributed kernel component, CFSs 201 on the various platforms 110 collectively assemble the various individual file system domains into a single, unitary namespace underneath a common root. Additionally, the distributed nature of CFSs 201 may maintain cache coherency across cluster members to ensure that all cluster members have the same view of the file system. Local file system 202 performs file operations using conventional processing. Device request dispatch module 203 controls I/O to physical devices 151 through device drivers 204. Device request dispatch module 203 may enforce single-system open semantics so only one program can open a device at any one time. Additionally, device request dispatch module 203 may be implemented so that it may make physical disk and tape storage available to all cluster members regardless of where the storage is physically located.

Additional details related to SSI clusters and cluster file systems may be found in the "TruCluster Server: Cluster Technical Overview" published by Hewlett-Packard Company, September 2002, which is incorporated herein by reference.

Referring again to FIG. 1, system 100 further comprises workload management software modules. For example, within each virtual machine 141, a respective performance monitor 144 may be executed. Performance monitor 144 is a software process that monitors operations associated with application(s) 143 to generate data that is indicative of whether each application 143 is performing in an expected manner and/or whether allocation of additional resources would be beneficial. For example, performance monitor 144 may examine the length of time required to perform certain types of transactions (e.g., the length of time associated with a particular database query). Additionally or alternatively, performance monitor 144 may examine the utilization rates associated with the virtual resources assigned to its respective virtual machine 141.

System 100 further includes global workload manager (gWLM) 122. In one embodiment, gWLM 122 obtains performance data from performance monitors 144. Additionally or alternatively, gWLM 122 may obtain related performance data from host operating system 120. gWLM 122 analyzes the received performance data in view of service level objectives (SLOs). SLOs are parameters that encode the desired operating goals of applications 143. For example, an SLO may be encoded to specify that an application 143 should perform a given type of database transaction within 10 milliseconds. Additionally or alternatively, an SLO may be defined so that the utilization rate associated with a virtual machine 141 should remain below 85%.

If a particular application 143 is not achieving the respective SLO(s), gWLM 122 may allocate additional resources to the respective virtual machine 141 of the application. As previously mentioned, virtual machines 141 are processes executed on top of host operating system 120. Host operating system 120 schedules the execution of processes according to entitlement parameters associated with virtual machines 141. To allocate additional resources to a particular virtual machine 141, gWLM 122 may effect a change in the entitlement parameter associated with the virtual machine 141 through a suitable system call to virtualization layer 121. In response, host operating system 120 increases the relative scheduling of the execution of the process associated with the respective virtual machine 141. Specifically, the respective process receives a greater number of "time slices" of one or several physical CPUs 131 thereby improving the performance of the application 143.

It is possible that sufficient physical resources may not be available for allocation when gWLM 122 determines that a particular application 143 is underperforming. Sufficient virtual resources may be assigned to virtual machines 144 such that substantially all physical resources of a respective server platform 110 are consumed. If sufficient physical resources are not available, gWLM 122 may reallocate resources between virtual machines 141. Specifically, gWLM 122 may decrease the physical resources assigned to another virtual machine 141 and concurrently increase the physical resources assigned to the virtual machine 141 that has the underperforming application 143.

To perform the reassignment of physical resources, several tiers of SLOs may be defined for applications 143. Each tier of SLOs may be associated with a different amount of resources. Also, each tier may be associated with a priority level. By encoding SLOs in this manner, gWLM 141 may reassign resources to achieve the highest tier of SLOs possible given the existing workloads. Accordingly, the multiple tiers of SLOs enable allocation decisions to be made for multiple applications 143 experiencing dynamically varying workloads. Additional details regarding the use of multiple tiers of SLOs to assign resources may be found in U.S. patent application Ser. No. 10/206,594, entitled "DYNAMIC MANAGEMENT OF VIRTUAL PARTITION COMPUTER WORKLOADS THROUGH SERVICE LEVEL OPTIMIZATION," filed Jul. 16, 2002, now U.S. Pat. No. 7,140,020, which is incorporated herein by reference.

In one embodiment, gWLM 122 may move a virtual machine 141 from one platform 110 to allocate additional resources to the virtual machine 141. For example, gWLM 122 may utilize cluster management software 123 to obtain information related to the resources available on each server platform 110, the virtual machines 141 present on each platform 110, the applications 143 executing within the virtual machines 141, and/or other suitable information. When an application 143 is underperforming and additional resources on its server platform 110 are not currently available, gWLM 122 may examine the resources available on the other platform 110. If resources are available on the other platform 110, gWLM 122 may move the respective virtual machine 141 to the other platform 110.

It is possible to move a virtual machine 141 between platforms 110, because the virtual machines 141 are executed as processes on top of host operating system 120. Specifically, the execution of a virtual machine 141 to be moved may be temporarily interrupted. The virtual processor state may be saved. Corresponding virtual resources may be created on the other platform 110 and a virtual machine process created on top of the other host operating system. The execution of the virtual machine may then be resumed using the saved processor state. The process associated with the originating platform may be terminated. Additionally, because each virtual machine 141 is allocated a virtual network interface and responds to the same network address independently of the supporting server platform 110, the transition between platforms 110 is transparent to applications 143 and client platforms (not shown).

The transition of virtual machines 141 between server platforms 110 using system 100 may occur in an advantageous manner. For example, because system 100 is an SSI system, local storage facilitates (attached storage devices) may be used by applications 143. Specifically, the cluster file system presents a consistent and unified view of storage 150 associated with the entire cluster system 100. If an application 143 uses a virtual disk associated with a local storage device 151, the cluster file system 201 enables the same virtual disk to be accessed even when the virtual machine 141 is moved between platforms 110.

Figure 3:
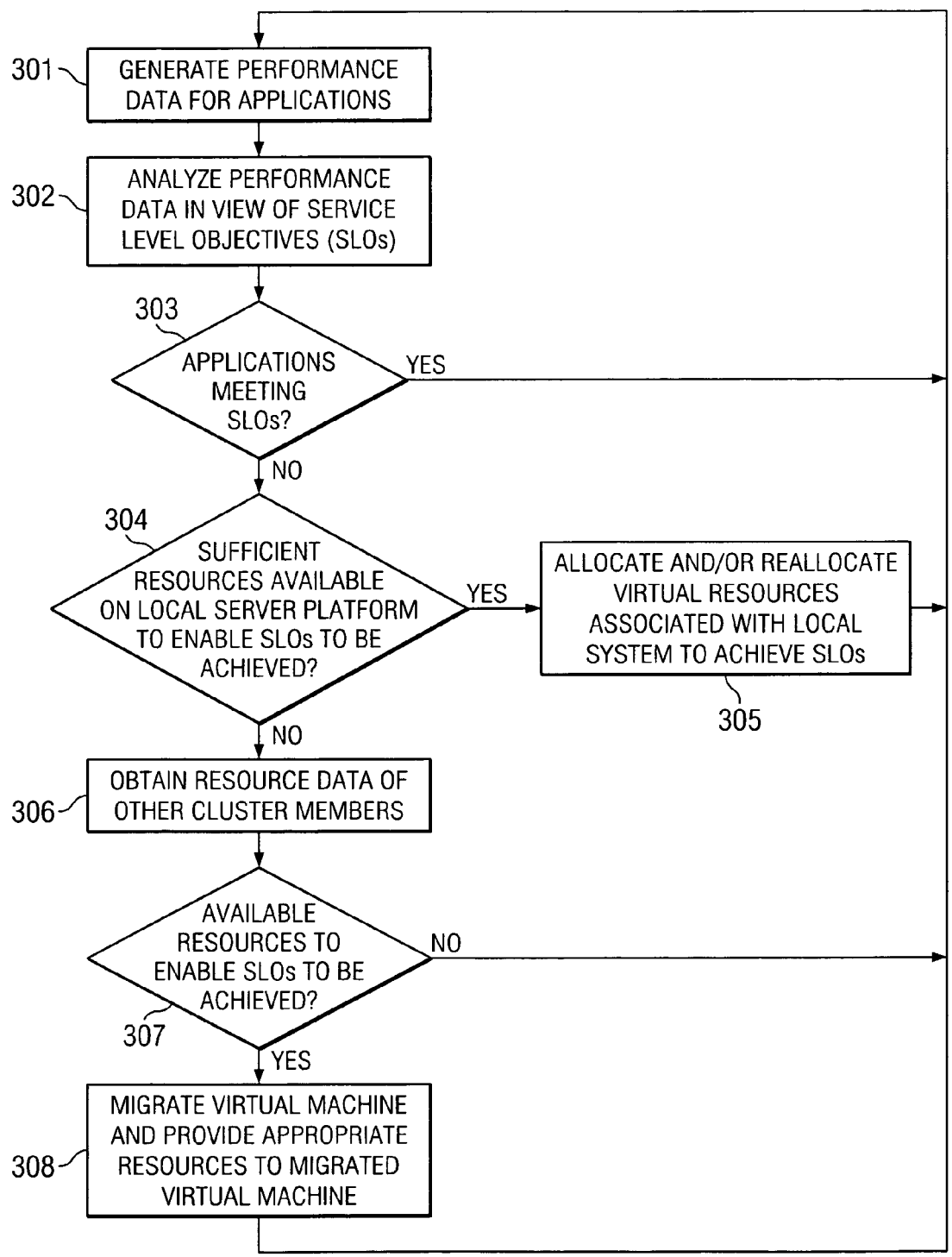
FIG. 3 depicts a flowchart for managing virtual machines according to one representative embodiment.

FIG. 3 depicts a flowchart for managing virtual machines in a cluster system according to one representative embodiment. In block 301, performance data is generated for applications executed in a number of virtual machines. The performance data may be generated by a performance monitoring software process within the virtual machines. Additionally or alternatively, performance data may be obtained using operating system calls. The generated performance data enables the evaluation of application performance to be performed.

In block 302, the performance data is analyzed in view of service level objectives. As previously mentioned, service level objectives are parameters that encode the desired operating goals of the applications. In block 303, a logical comparison is made to determine whether the applications are meeting the SLOs. If so, the process flow returns to block 301 for continued operation.

If the applications are not meeting the SLOs, the process flow proceeds to block 304 where a logical comparison is made to determine whether sufficient resources are available on the local system to achieve the SLOs. If so, the process flow proceeds to block 305 where resources are allocated or reallocated to achieve the SLOs. Specifically, if unassigned resources are available, the unassigned resources may be allocated to the virtual machine(s) that are associated with underperforming applications. Alternatively, if a first application is "overachieving," underutilized or idle resources may be reallocated from the virtual machine that has the overachieving application to the virtual machine that has the underperforming application. As previously mentioned, reassignment of processor resources for virtual machines may involve changing the processor scheduling associated with the virtual machines. The scheduling may occur using parameters that define the amount of "processor slices" given to each virtual machine. Accordingly, the reallocation of resources may involve changing the relative parameters of the various virtual machines. From block 305, the process flow returns to block 301.

If the logical comparison of block 304 determines that local resources are insufficient, the process flow proceeds from block 304 to block 306. In block 306, resource data of other cluster members is obtained. In block 307, a logical comparison is made to determine whether resources are available on other cluster members to enable SLOs to be achieved. If not, the process flow returns to block 301. If resources are available, the process flow proceeds to block 308. In block

308, the virtual machine containing the underperforming application is migrated to another cluster member and appropriate resources are provided to the migrated virtual machine. From block 308, the process flow returns to block 301.

When implemented in software, the elements of some representative embodiments, such as the operations of the flowchart shown in FIG. 3, are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc.

Some representative embodiments may provide a number of advantageous characteristics. For example, the allocation of resources to workloads may occur without any changes to applications that service the workloads. Specifically, virtual machines are virtualized containers that appear to application software as a separate server. Because all of the resources being consumed by a respective virtual machine are shared among multiple virtual machines, it is possible to change the resource entitlements in a completely transparent manner to the application and virtual machines.

The ability to manage virtual machines according to service level objectives enables more efficient use of resources. Specifically, when resources are shifted between virtual machines and virtual machines are migrated between cluster members, resource utilization can be maximized in response to dynamically changing workloads. Accordingly, a smaller number of resources (processors, memory, etc.) may be used to support the same number of applications than would otherwise be employed.

Additionally, the use of the SSI functionality of a cluster system enables attached storage to be used. Specifically, the cluster file system enables transparent access to both direct attached and network attached storage devices. A file implementing a virtual disk may be accessed from any cluster member without regard to the physical location of the file. Accordingly, if a virtual machine is migrated between cluster members, any storage that the virtual machine was using on the previous cluster member will continue to be available.

Administration of an SSI cluster system adapted to manage virtual machines is an efficient process, because all of the cluster members may be managed as a single entity. Typical management tasks can be performed once for all cluster members. For example, configuration file of a virtual machine to support a given workload need only occur once and the virtual machine may be placed anywhere within the cluster system.

What is claimed is:

1. A method comprising:
    executing a plurality of virtual machines on a plurality of nodes of a cluster computing system, wherein at least one application is executed within each of said plurality of virtual machines;
    generating data that is related to performance of said applications in said virtual machines;
    analyzing, by a management process, said data in view of parameters that encode desired performance levels of said applications;
    migrating, by said management process, a virtual machine on a first node to a second node of said plurality of nodes in response to said analyzing; and
    wherein said analyzing further comprises determining whether resources are available on said first node for allocation to said virtual machine before performing said migrating, and changing relative entitlement parameters associated with said virtual machine and at least one other virtual machine on said first node in response to said analyzing.

2. The method of claim 1 wherein said cluster computing system comprises a distributed file system that presents a single image of storage resources of said cluster computing system with a single root.

3. The method of claim 2 wherein said virtual machine is assigned virtual storage resources that use storage resources directly attached to said first node.

4. The method of claim 3 wherein said virtual machine continues to access virtual storage resources that use storage resources directly attached to said first node after migration to said second node.

5. The method of claim 2 further comprising:
    defining a configuration file, for each of said plurality of virtual machines, that is independent from which node of said plurality of nodes is used to execute the respective virtual machine.

6. The method of claim 1 wherein said determining comprises:
    identifying underutilized resources.

7. The method of claim 1 wherein said determining comprises:
    identifying unassigned resources.

8. A cluster system comprising:
    a plurality of cluster nodes that provide hardware elements to support software operations;
    a plurality of virtual machines executing on said plurality of cluster nodes, wherein at least one application is executed within each of said plurality of virtual machines;
    a management process located on at least one of said plurality of cluster nodes, wherein said management process analyzes performance data associated with said applications executing within said plurality of virtual machines, and migrates virtual machines between said plurality of cluster nodes in response to analysis of said performance data;
    said management process compares said performance data to a plurality of parameters that encode desired operating goals of said applications executed within said plurality of virtual machines; and
    said management process determines whether resources are available for reallocation on cluster node executing a virtual machine before migrating said virtual machine to another cluster node, and changes relative entitlement parameters associated with said virtual machine and at least one other virtual machine on said cluster node in response to analyzing said performance data.

9. The cluster system of claim 8 comprising:
    a distributed file system implemented within operating systems of said plurality of cluster nodes.

10. The cluster system of claim 9 wherein said distributed file system presents a unified image of storage resources of said cluster system to software processes that is independent from cluster nodes upon which said software processes are executed.

11. The cluster system of claim 9 wherein said distributed file system enables an application, that accesses a virtual disk implemented using a storage peripheral directly attached to a cluster node executing said application, to continue accessing said virtual disk after said application's virtual machine is migrated between cluster nodes.

12. The cluster system of claim 8 wherein a respective performance monitor process is executed within each virtual machine to generate said performance data analyzed by said management process.

13. The cluster system of claim 8 further comprising:
a plurality of operating systems executed on said plurality of cluster nodes that virtualize physical resources to implement said plurality of virtual machines.

14. A computer readable medium having code stored thereon for implementing management of applications executed within virtual machines of a cluster system, said code comprising:
code for generating performance data related to execution of said applications within said virtual machines of said cluster system;
code for processing said performance data to determine whether said applications are satisfying desired operating goals encoded within a set of parameters;
code for determining whether resources are available on a single cluster node for allocation to said virtual machines before performing migration;
code for changing relative entitlement parameters associated with said virtual machines on said single cluster node in response to said code for determining; and
code for migrating virtual machines between cluster nodes of said cluster system in response to said code for processing.

15. The computer readable medium of claim 14 said code stored thereon further comprising:
code for reallocating resources between virtual machines on the single cluster node.

16. The computer readable medium of claim 15 wherein said code for migrating is operable when resources not available for reallocation by said code for reallocating.

17. The computer readable medium of claim 14 said code stored thereon further comprising:
code for providing a cluster file system that enables access to storage resources of said cluster system by software processes independently of which cluster node executes said software processes.

* * * * *